United States Patent
Berninger et al.

(10) Patent No.: US 6,761,189 B2
(45) Date of Patent: Jul. 13, 2004

(54) WEARING RING

(75) Inventors: Alwin Berninger, Augsburg (DE);
Stefan Karlinger, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 235 days.

(21) Appl. No.: 10/039,033

(22) Filed: Jan. 2, 2002

(65) Prior Publication Data
US 2002/0130513 A1 Sep. 19, 2002

(30) Foreign Application Priority Data

Jan. 19, 2001 (DE) ...................................... 201 00 947 U

(51) Int. Cl.[7] .................................................. F16L 9/00
(52) U.S. Cl. ....................... 138/157; 138/110; 138/104; 138/161; 138/108; 384/273
(58) Field of Search ................................. 138/110, 156, 138/157, 161, 168, 104, 162, 158, 108, 114; 384/273, 297

(56) References Cited

U.S. PATENT DOCUMENTS

| | | | |
|---|---|---|---|
| 3,757,031 A | * 9/1973 | Izraeli | 174/138 F |
| 4,178,949 A | 12/1979 | Mazon, III | 134/167 R |
| 4,986,575 A | 1/1991 | Braun | 285/325 |
| 5,007,666 A | * 4/1991 | Kyfes | 285/373 |
| 5,736,672 A | * 4/1998 | Huang | 174/35 R |
| 5,806,615 A | * 9/1998 | Appleton | 175/325.7 |
| 6,311,734 B1 | * 11/2001 | Petrovic | 138/110 |
| 6,352,369 B1 | * 3/2002 | Berninger | 384/273 |
| 6,403,182 B1 | * 6/2002 | Plummer et al. | 428/36.9 |
| 6,431,216 B1 | * 8/2002 | Briscoe | 138/110 |

FOREIGN PATENT DOCUMENTS

| | | |
|---|---|---|
| DE | 88 14 906 U1 | 3/1989 |
| DE | 89 04 843 U1 | 10/1990 |
| DE | 196 28 862 A1 | 1/1998 |
| DE | 299 20 972 U1 | 5/2001 |
| EP | 0 233 417 A | 8/1987 |
| EP | 0 979 709 A2 | 2/2000 |
| FR | 2 599 568 A | 12/1987 |

\* cited by examiner

*Primary Examiner*—Patrick Brinson
(74) *Attorney, Agent, or Firm*—McGlew and Tuttle, P.C.

(57) ABSTRACT

A wearing ring, particularly for protecting a cable guide hose on a robot, with an inner ring and an outer ring having in each case two half-shells is characterized in that the half-shells of at least one of the rings can be locked together.

26 Claims, 5 Drawing Sheets

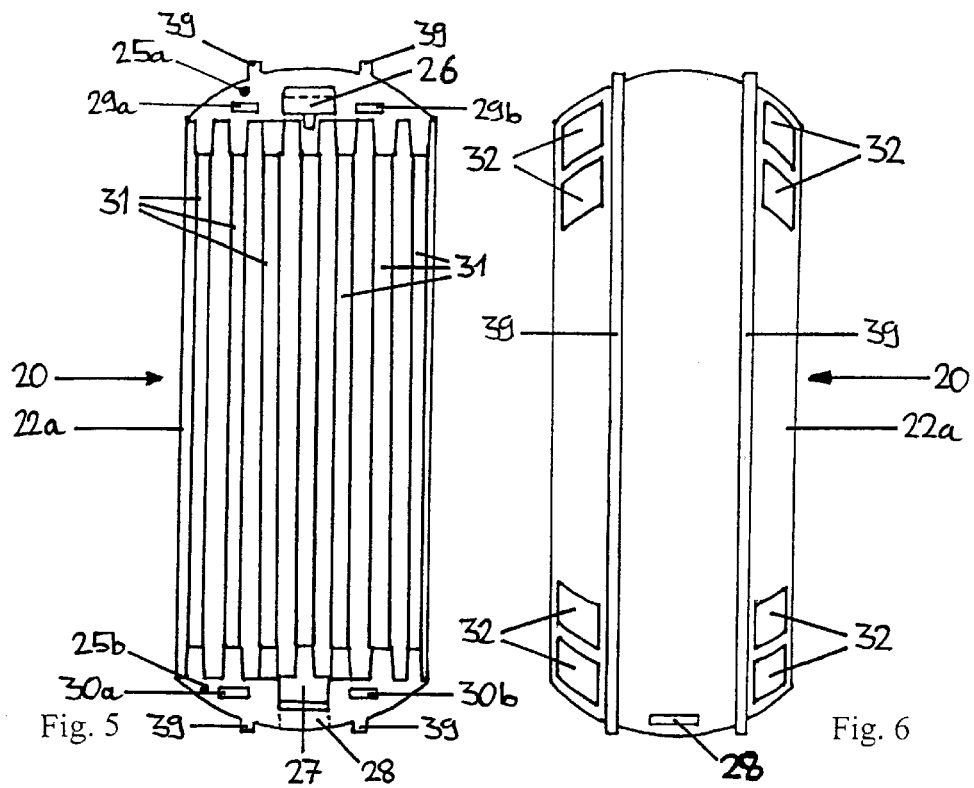
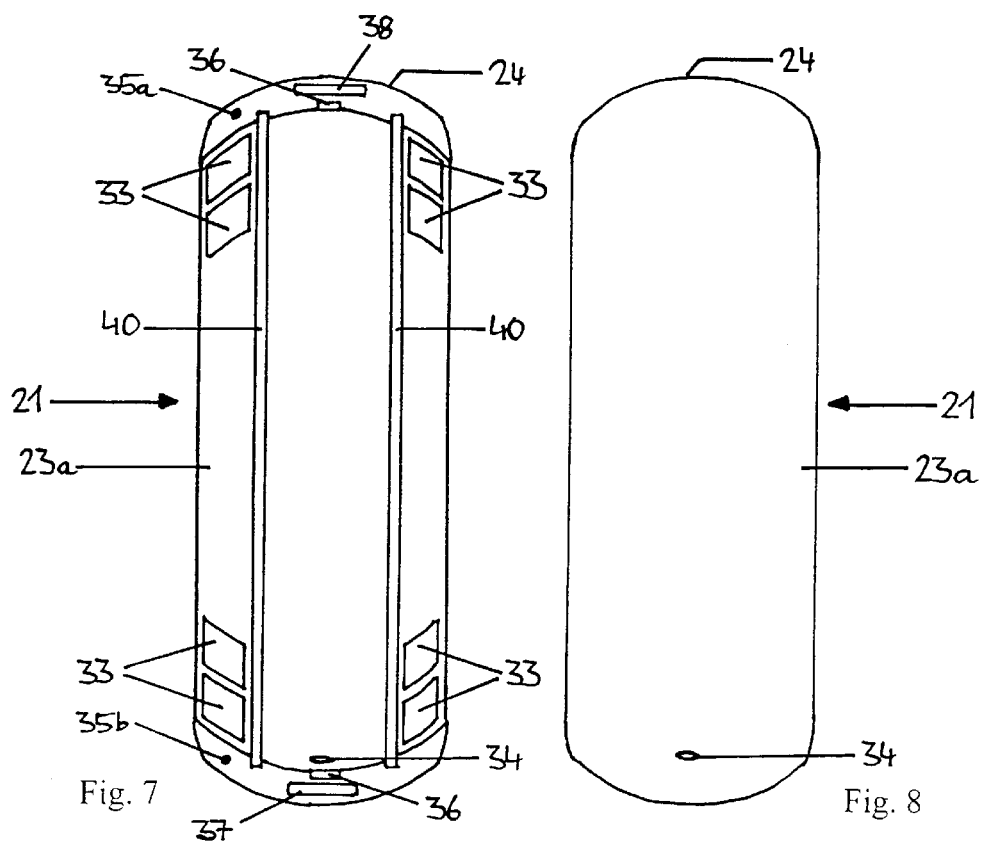
Fig. 5 Fig. 6
Fig. 7 Fig. 8

WEARING RING

FIELD OF THE INVENTION

The invention relates to a wearing ring, particularly for the protection of a cable guide hose on a robot, with an inner ring and an outer ring in each case having two half-shells, as well as a robot equipped with a cable guide hose having at least one such wearing ring.

BACKGROUND OF THE INVENTION

Cable guide or protection hoses or tubes are mainly used on machines, particularly robots having several parts pivotable relative to one another in order to guide outside the robot electric cables for the power supply of the robot or a tool located in a robot hand. During operation distance changes occur between individual points of the robot, so that the cable guide hose is exposed to mechanical wear particularly at locations where movable robot parts, such as a rocker arm, a robot arm or a robot hand can be in contact and there is a risk of chafing or fraying. In order to avoid hose damage as a result of chafing or fraying, it is known to locate at such critical points of the cable guide hose wearing rings, which are in turn frayed and subsequently replaced.

Wearing rings generally comprise two half-shells, which are interconnected by means of countersunk screws. If the wearing ring becomes frayed in the vicinity of the screw fastening, the countersunk heads of the screw project and can then damage machine or robot parts along which the wearing rings and consequently the projecting screw heads rub.

DE 298 14 418 U1 describes a wearing ring according to the preamble of claim 1, in which the half-shells of the inner ring are connected in either fixed manner or by frictional resistance to the half-shells of the outer ring. The outer and inner rings have different colours, so that after the outer ring has become worn, the colour of the inner ring is detectable and consequently indicates that the wearing ring must be replaced. For joining the half-shells use is made of plastic screws, which engage in a tapped hole located on the face of the second half-shell facing the first half-shell of the wearing ring. For fitting the screw the first half-shell has a hole which passes through it and which is aligned with the tapped hole of the second half-shell.

The relatively complicated and expensive manufacture of the tapped hole, e.g. through an additional part having the tapped hole and injection moulded into the given half-shell and the assembly and disassembly of the wearing ring with respect to the cable guide hose require the use of special tools constitute disadvantages.

The problem of the invention is to so further develop a wearing ring of the aforementioned type in such a way that it can be less expensively manufactured and can consequently be more easily and rapidly fitted and dismantled.

SUMMARY OF THE INVENTION

According to the invention this problem is solved by a wearing ring of the aforementioned type, in that the half-shells of at least one of the rings can be locked together.

As a result of the construction according to the invention on the one hand a simple, inexpensive, one-piece manufacture of the half-shells in a single process is possible and in the case of a plastic wearing ring more particularly by extrusion. On the other hand no tools are required for fitting the wearing ring to a cable guide hose, in that the half-shells of the wearing ring are not screwed together, but instead merely placed on the hose and locked together.

Advantageously in each case one half-shell of a ring is lockable by means of a tongue located on the face facing the other half-shell of this ring in a recess located on the face of the other half-shell of said ring and for releasing the tongue from the recess there is a hole connecting said recess of said half-shell to the outer circumference thereof. Thus, for the disassembly of the two half-shells of the ring it is merely necessary to have a substantially pin-like accessory, which is inserted into the hole located on the outer circumference of the half-shells in order to release the tongue from its locking position in the recess.

Preferably each half-shell of a ring on its face facing the other half-shell of said ring is equipped with the tongue and on its other face facing the other half-shell of said ring with the recess having the hole, so that both half-shells have an identical construction and consequently manufacturing costs are minimized. For reasons of easy accessibility during the release of the half-shells of the ring by inserting a substantially pin-like accessory into the hole linking the outer circumference of the half-shell with the recess in order to disengage the tongue from the recess, the hole preferably traverses the half-shell substantially perpendicular to the recess.

In order to prevent a release of the half-shells of the wearing ring according to the invention in reliable manner as the chafing of the outer ring progresses, preferably the half-shells of the inner ring can be locked together.

If in this case the half-shells of the inner ring are lockable in particular by means of a tongue located on at least one face facing the other half-shell of the inner ring in a recess located on the face of the other half-shell with a hole linking the recess with the outer circumference of the half-shell, the half-shells of the outer ring preferably have a radial hole aligned with the hole connecting the recess with the outer circumference of the half-shells of the inner ring. In this way the half-shells of the inner ring can be easily detached from one another without removing the outer ring from the inner ring, in that a pin-like accessory is introduced through the radial hole of the outer ring into the hole in the inner ring, in order to disengage the tongue from the recess.

In order to solve the problem of the invention, in the case of a wearing ring of the aforementioned type the half-shells of the outer ring can be locked with the half-shells of the inner ring.

As a result of this construction no tools are required for fitting the half-shells of the inner ring to the half-shells of the outer ring in that the latter are locked with the half-shells of the inner ring by pressing thereon and can be fixed thereto in positive manner.

The half-shells of the outer ring are preferably fixable by means of internally positioned detents on complimentary locking depressions provided on the outside of the half-shells of the inner ring, so that on pressing the half-shells of the outer ring onto the half-shells of the inner ring, the detents engage in the locking depressions, which can in particular be ensured by undercuts of the locking depressions in which engage the complimentary detents. Alternatively or additionally, it is obviously possible to fix the half-shells of the inner ring by means of externally located detents on complimentary locking depressions provided on the inside of the half-shell of the outer ring.

The detents and locking depressions are preferably placed in each case in the vicinity of the ends of the half-shells and preferably in the region of the ends of the half-shells in each case two axially spaced detents or locking depressions are arranged in circumferentially succeeding manner. Thus, the half-shells of the outer ring are securely and reliably fixed to the half-shells of the inner ring in the vicinity of the facing ends.

For releasing the half-shells of the outer ring from the half-shells of the inner ring, on the face of the half-shells of the inner ring on the side facing the half-shells of the outer ring a break is preferably provided and by inserting an accessory, e.g. a screwdriver, ensures a simple and rapid release of the half-shells by disengaging the detents from the locking depressions. Alternatively or additionally and for the same purpose, it is obviously possible to provide a break on the faces of the half-shells of the outer ring on the side facing the half-shells of the inner ring.

In a preferred development, on the outside of the half-shells of the inner ring and on the inside of the half-shells of the outer ring are provided complimentary centring devices, which are e.g. formed by at least one circumferentially positioned circumferential projection on the outside of the half-shells of the inner ring and at least one circumferential groove located on the inside of the half-shells of the outer ring or by at least one circumferentially positioned circumferential projection on the inside of the half-shells of the outer ring and at least one circumferential groove located on the outside of the half-shells of the inner ring. Preferably there are two circumferentially positioned circumferential projections and two circumferential grooves complimentary thereto.

In a further development of the wearing ring according to the invention, on facing faces of the half-shells of at least one of the rings are provided centring means, so that frontally contacting half-shells are perfectly aligned. The centring means are preferably located on the faces of both the outer and the inner ring.

The centring means are preferably in the form of at least one projection located on at least one face of the half-shell of one ring and at least one complimentary depression located on the face of the other half-shell of said ring facing the first face, so that the projection located on one face of the half-shell of said ring in each case engages in the complimentary depression provided on the face facing the same of the other half-shell of said ring. In order to ensure the same structure of the two half-shells of the inner and outer ring, preferably each half-shell of the particular ring, preferably on its face facing the other half-shell of said ring, is provided with at least one projection and on its other face facing the other half-shell of this ring with at least one complimentary depression.

In another advantageous construction, the half-shells of the inner ring are provided on the inside with circumferentially passing ribs for fixing on a ribbed cable guide hose. There are in particular at least four ribs, so that the wearing ring can also be used for joining two hose portions of the cable guide hose, which are in each case held by at least two of the inside ribs of the wearing ring. This makes it possible to use the wearing ring according to the invention as a coupling sleeve for several hose portions, e.g. when using hose portions with different elasticity.

It is particularly advantageous to design the ribs in such a way that at least some ribs project from the face of one half-shell of the inner ring and the ribs of the other half-shell of the inner ring aligned with the projecting ribs of one half-shell are correspondingly recessed, so that said ribs, apart from fixing to the cable guide hose, are additionally used for centring the two half-shells of the inner ring. In order to obtain a unitary construction, preferably each half-shell of the inner ring is equipped on its face facing the other half-shell of the inner ring with at least two projecting ribs, whilst the same ribs are correspondingly recessed on their other face.

As has already been indicated, both the inner and outer rings are preferably made from plastic, whereby the inner and outer rings are in particular made from different coloured plastics, so that following the wearing of the outer ring the colour of the inner ring can be detected and in this way the necessary replacement of the wearing ring is indicated. The inner ring is appropriately provided with a conspicuous colour, e.g. signal red, signal yellow, etc.

The invention also relates to a robot equipped with a cable guide hose having at least one wearing ring of the aforementioned type.

BRIEF DESCRIPTION OF THE DRAWINGS

The invention is described in greater detail hereinafter relative to embodiments and with reference to the attached drawings, wherein show:

FIG. 5 A front view of a half-shell of the inner ring of the wearing ring according to FIG. 4.

FIG. 6 A rear view of a half-shell of the inner ring of the wearing ring according to FIG. 4.

FIG. 7 A front view of a half-shell of the outer ring of the wearing ring of FIG. 4.

FIG. 8 A rear view of a half-shell of the outer ring of the wearing ring of FIG. 4.

DETAILED DESCRIPTION OF THE DRAWINGS

Figure 1:
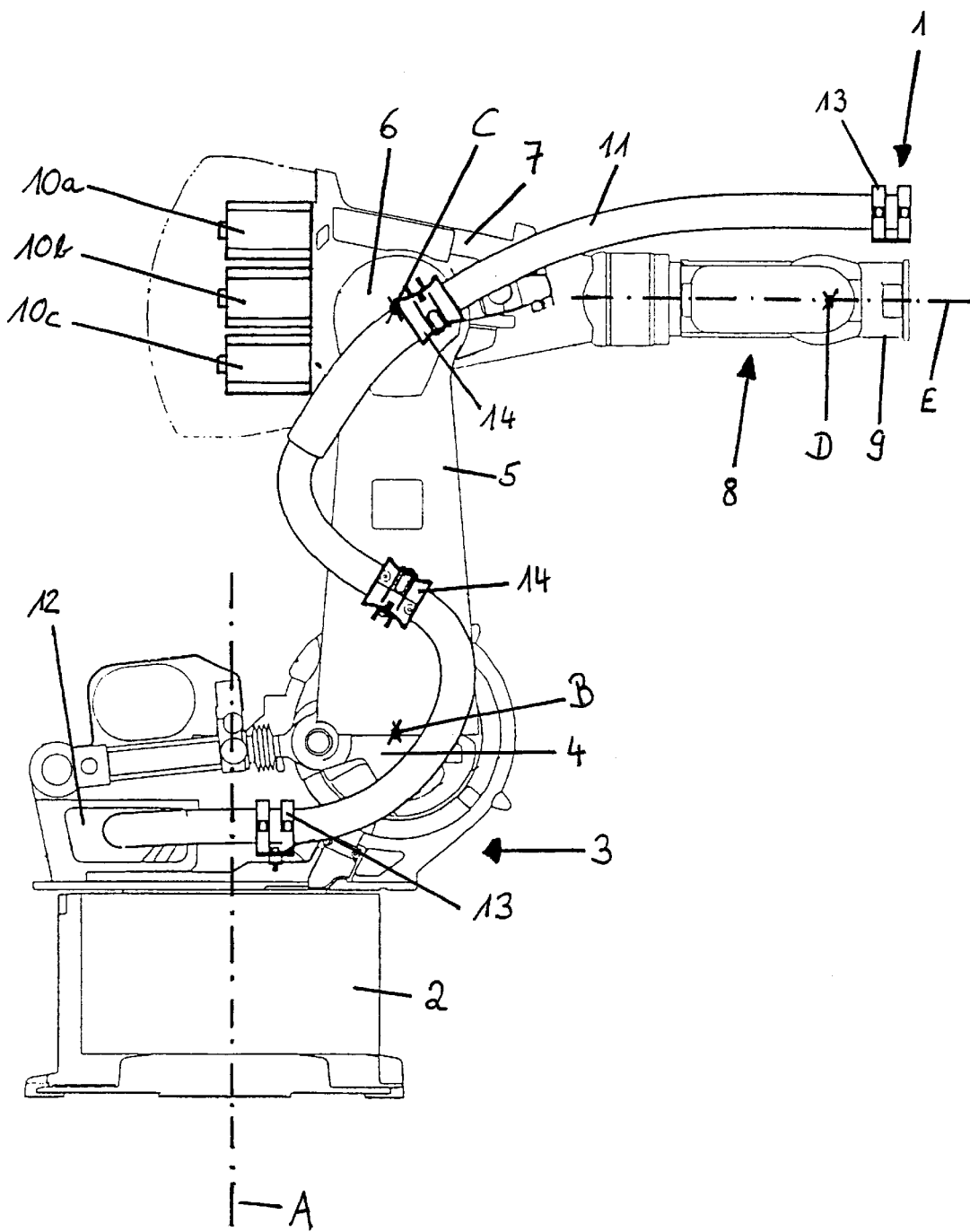
FIG. 1 A side view of a robot.

The robot shown in FIG. 1 has a base 2 which is e.g. firmly connected to the ground and on which is located a robot base member 3, the "carrousel", which is rotatable about the vertical A-axis. A rocker arm 5, pivotable by means of a motor 4 about the horizontal B-axis, is placed on the base member 3. On its free end remote from the base member 3 is located a robot arm 7, which is pivotable therewith by means of a motor 6 about the horizontal C-axis. The robot arm carries at its front, free end 8 a robot hand 9, which can be pivoted about a further horizontal D-axis and an E-axis perpendicular thereto. The pivoting about the E-axis can result from a drive member located at the rear end of the robot arm. Additional movements of a robot hand 9 having a complicated construction, such as a double angle hand or a tool, can be brought about by further motors 10a, 10b, 10c located at the rear end of the robot arm 7 by means of drive members extending through the latter.

Both the motors and the tools, such as e.g. welding tools, are supplied with power from the base 2. This can take place within the different robot parts or also on the outside of the robot 1, which is advantageous in many cases. In order to protect the cables for the power supply of motors or tools, they are surrounded by a cable guide hose 11, which is positioned along the outside of the robot 1 and secured thereto in punctiform manner. The fixing of the cable guide hose 11 to the base member 3 takes place in the embodiment shown by means of a bulkhead 12, whilst for further fixing the hose 11 over the length thereof, e.g. to the rocker arm 5 or robot arm 7 clips 13 and hose holders 14 are provided. The latter serve to support and guide the cable guide hose 11 at one or more points on the rocker arm 5 and on the arm 7 of robot 1.

Figure 2:
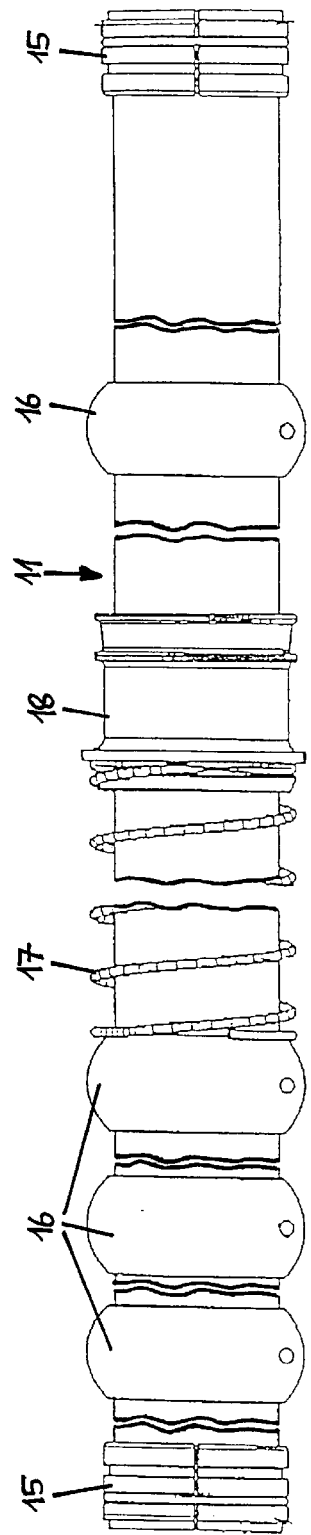
FIG. 2 A side view of a cable guide hose with its essential components.
Figure 3:
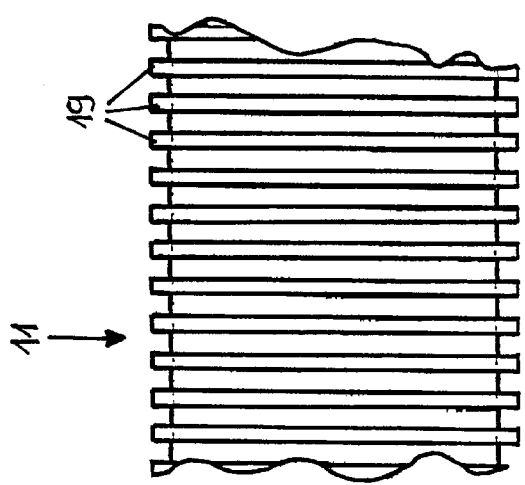
FIG. 3 A detail view of the cable guide hose according to FIG. 2.

As can be gathered from FIG. 2, the cable guide hose 11 is terminally provided with end pieces 15. At its critical points it is also equipped with wearing rings 16, which prevent a direct chafing and therefore damage to the cable guide hose 11 on moving robot parts, such as on the rocker arm 5, robot arm 7 or robot hand 9 (FIG. 1). The cable guide hose 11 can also have a compression spring 17, which brings the same into a starting position in the case of relief with respect to the rotor movements. A spring end holder 18 e.g. serves as the abutment for the compression spring 17. The cable guide hose 11 is in particular a hose 11 provided with circumferentially positioned ribs 19 (FIG. 3).

Figure 4:
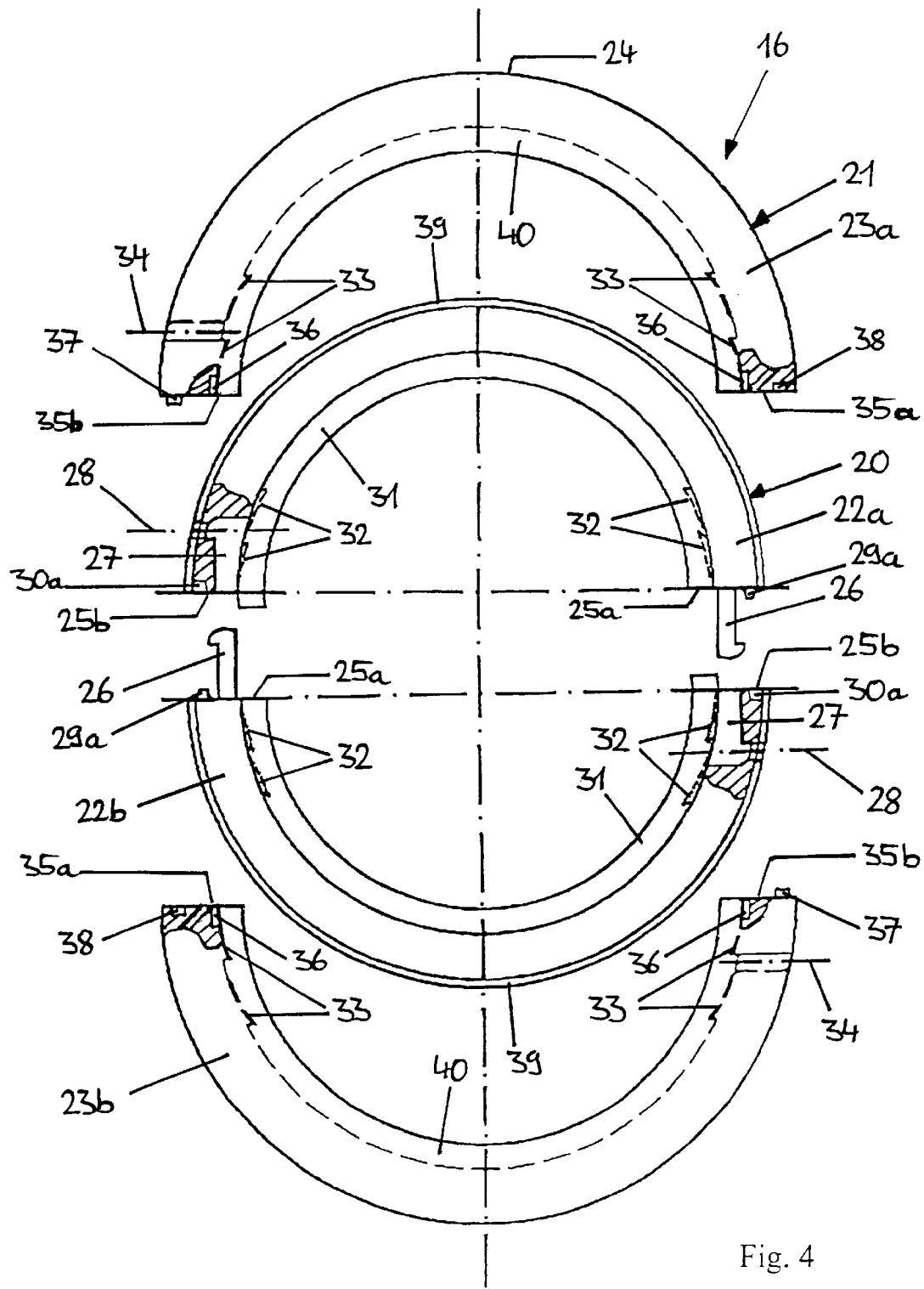
FIG. 4 A plan view of a wearing ring in an exploded view.

FIG. 4 is an exploded plan view of the wearing ring 16, which comprises an inner ring 20 and an outer ring 21, which in each case have two half-shells 22a, 22b; 23a, 23b. The axial outer contour 24 of the wearing ring 16 is e.g. substantially pitch circular. The inner ring 20 and outer ring 21 are made from different coloured plastics, the colour of the inner ring 20 being chosen in such a way that there is a clear contrast with the colour of the outer ring 21. Thus, the outer ring 21 is e.g. black or grey, whereas the inner ring 20 is signal red. For manufacturing reasons the half-shells 22a, 22b of the inner ring and the half-shells 23a, 23b of the outer ring 21 have in each case an identical construction.

For simply and rapidly fixing the half-shells 22a, 22b of the inner ring 20 to one another or to a cable guide hose 11 (FIG. 2), on a face 25a facing the other half-shell 22b, 22a, each half-shell 22a, 22b has a substantially hook-shaped tongue 26 and on its other face 25b facing the other half-shell 22b, 22a a recess 27, into which can in each case be locked the tongue 26 of the other half-shell 22b, 22a. For releasing the tongue 26 on each recess 27 is provided a hole 28 connecting it to the outer circumference of the half-shell 22a, 22b, which traverses the half-shell 22a, 22b substantially perpendicular to the recess 27 or to the tongue 26 lockable therein. In the vicinity of the hook-shaped end of the tongue 26, the hole 28 is appropriately located in the locking position in order to release the tongue 26 simply and rapidly by means of a random pin-like accessory (not shown) introduceable into the hole 28 and in this way permit the dismantling of the inner ring 20.

As can in particular be gathered from FIG. 5, which is a front view of the half-shell 22a of inner ring 20, each half-shell 22a, 22b has on its faces 25a, 25b facing the other half-shell 22b, 22a centring means. In the embodiment shown the centring means are in each case formed by two projections 30a, 30b located on face 25a of half-shells 22a, 22b and which in each case engage in two complimentary depressions 31a, 31b on the other face 25b of half-shells 22a, 22b.

In addition, the half-shells 22a, 22b of the inner ring 20 are equipped on the inside with circumferentially directed ribs 31, which engage in the ribs 19 of the cable guide hose 11 (FIG. 3), so that the wearing ring 16 can be fitted in axially fixed manner at a random point of the cable guide hose and can also be used as a coupling sleeve for two hose portions. In the embodiment shown there are e.g. seven ribs 31 (FIG. 5). In addition, two ribs 31, e.g. the third and fifth ribs 31, project from one face 25b of half-shell 22a, 22b, whilst the same ribs 31 are correspondingly recessed on the other face 25a of half-shell 22a, 22b, in order to ensure a perfect centring of the half-shells 22a, 22b (FIG. 4).

For securing the half-shells 23a, 23b of outer ring 21 on the half-shells 22a, 22b of inner ring 20, the latter are provided with externally positioned locking depressions 32 (FIGS. 4 and 6), on which can be frictionally secured complimentary detents 33 (FIGS. 4, 7) located on the inside of the half-shells 23a, 23b of outer ring 21. This is ensured in the embodiment shown by undercuts of the locking depressions 32 in which engage the detents 33. The detents 33 or locking depressions 32 are in each case positioned in the vicinity of the ends of the half-shells 22a, 22b; 23a, 23b and in each case two axially spaced detents 33 or locking depressions 32 are arranged in circumferentially succeeding manner in order to reliably and securely fix the outer ring 21 on the inner ring 20. Alternatively or additionally the detents 33 can obviously also be located on the inner ring 20 and the locking depressions 32 on the outer ring 21.

As is apparent from FIGS. 4, 7 and 8, the half-shells 23a, 23b of the outer ring 21 are also provided in each case with a radial hole 34, which is aligned with the hole 28 linking the recess 27 with the outer circumference of the half-shells 22a, 22b of inner ring 20. The radial holes 34 are used for introducing a substantially, pin-like accessory (not shown) into the holes 28 of the inner ring 20 for releasing the tongues 26 from the recesses 27, so that the half-shells 22a, 22b of the inner ring 20 can be easily and rapidly separated from one another without previously removing the half-shells 23a, 23b of the outer ring 21.

For releasing the half-shells 23a, 23b of the outer ring 21 from the half-shells 22a, 22b of the inner ring 20, on each face 35a, 35b of the half-shells 23a, 23b of the outer ring 21 is provided a central break 36, which is used for introducing an accessory, e.g. a not shown screwdriver, in order in this way to disengage the detents 33 from the locking depressions 32. Alternatively or additionally corresponding breaks can obviously also be provided frontally on the half-shells 22a, 22b of inner ring 20 (not shown).

On the facing faces 35a, 35b of the half-shells 23a, 23b of outer ring 21 are also provided centring means, which in the embodiment shown are formed by a central projection 37 on one face 35b and a complimentary depression 38 on the other face 35a.

As can be gathered from FIGS. 4, 6 and 7, on the outside of the half-shells 22a, 22b of inner ring 20 and on the inside of half-shells 23a, 23b of outer ring 21 are provided complimentary centring devices. In the embodiment shown they are formed e.g. by two circumferential projections 39 located on the outside of the half-shells 22a, 22b of the inner ring 20 in the circumferential direction and two complimentary circumferential grooves 40 located on the inside of half-shells 23a, 23b of outer ring 21 in the circumferential direction. Alternatively random other centring devices formed by complimentary shapes are conceivable.

Figure 9:
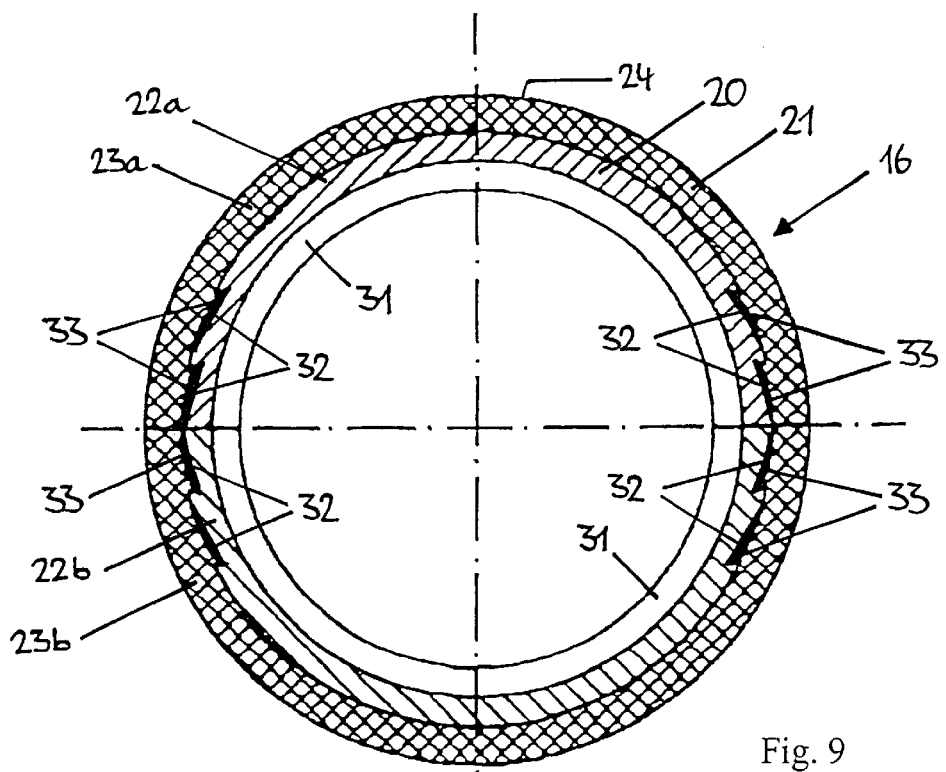
FIG. 9 A cross-section through the wearing ring of FIGS. 4 to 8 in the vicinity of the detents and locking depressions.
Figure 10:
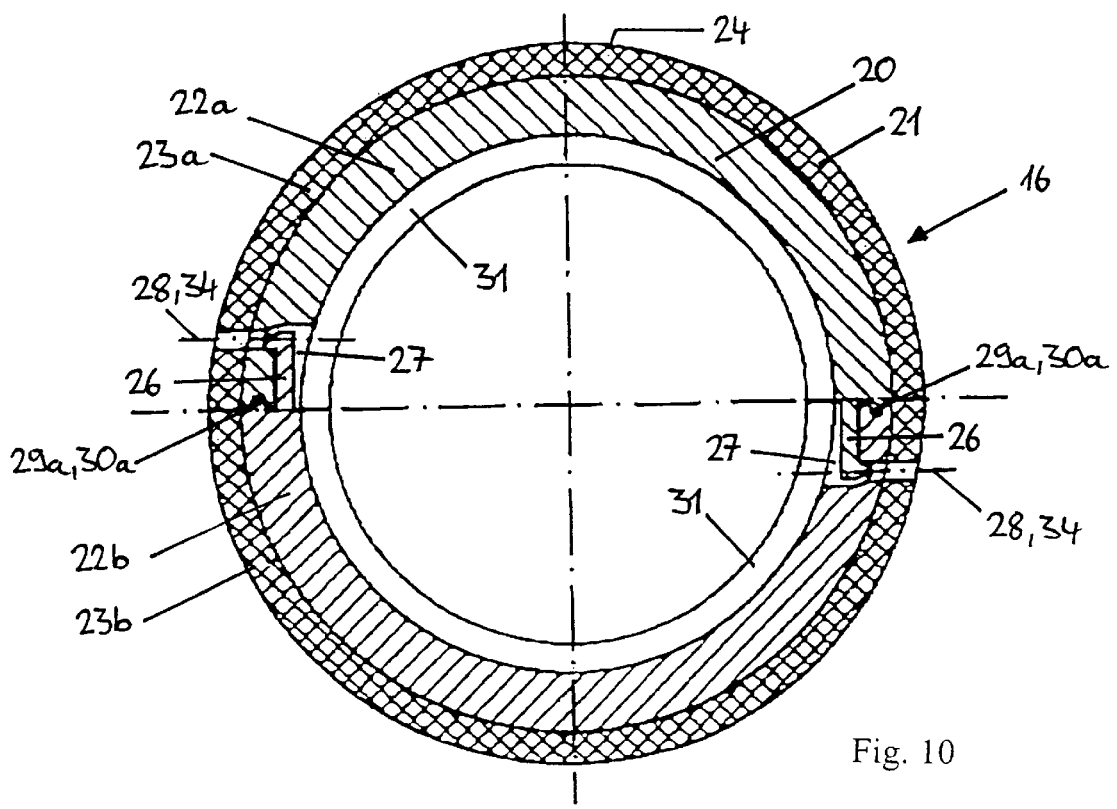
FIG. 10 A cross-section through the wearing ring according to FIGS. 4 to 8 in the vicinity of the inner ring tongues engaging in the recesses.

Whereas in FIG. 9 once again is shown a cross-section through the fitted wearing ring 16 in the vicinity of the engaging detents 33 and locking depressions 32, FIG. 10 shows a corresponding cross-section in the vicinity of the tongues 26 of inner ring 20 locked in recesses 27.

The assembly and disassembly of the wearing ring 16 with respect to a cable guide hose 11 will now be described.

The half-shells 22a, 22b of the inner ring 20 are placed with their inside ribs 31 on the ribs 19 of the cable guide hose 11 and fixed by pressing against one another, the tongues 26 locking in the recesses 27. Before or afterwards the half-shells 23a, 23b of outer ring 21 are pressed onto the half-shells 22a, 22b of inner ring 20 and engagement takes place between the detents 33 and the locking depressions 32. The wearing ring 16 is consequently easily and rapidly fitted without the use of tools.

For the disassembly of the wearing ring 16, a random, substantially pin-like object is introduced into the radial hole 34 of the outer ring 21 aligned with the hole 28 in inner ring 20 in order to extract the tongues 26 from the recesses 27 and permit the removal of the half-shells 22a, 22b of inner ring 20 together with the half-shells 23a, 23b of outer ring 21 from the cable guide hose. For separating the half-shells 22a, 22b of inner ring 20 from the half-shells 23a, 23b of outer ring 21, e.g. a screwdriver is introduced into the frontal breaks 36 of the outer ring 21 and the detents 33 are released from the locking depressions 32. Thus, the wearing ring is disassembled in a correspondingly easy manner.

LIST OF REFERENCE NUMERALS

| | |
|---|---|
| 1 | Robot |
| 2 | Base |
| 3 | Base member |
| 4 | Motor |
| 5 | Rocker arm |
| 6 | Motor |
| 7 | Robot arm |
| 8 | Free end of robot arm |
| 9 | Robot hand |
| 10a–c | Motors |
| 11 | Cable guide hose |
| 12 | Bulkhead |
| 13 | Clip |
| 14 | Hose bolder |
| 15 | End piece |
| 16 | Wearing ring |
| 17 | Compression spring |
| 18 | Spring end holder |
| 19 | Ribs |
| 20 | Inner ring |
| 21 | Outer ring |
| 22a, 22b | Half-shells of inner ring |
| 23a, 23b | Half-shells of outer ring |
| 24 | Outer contour |
| 25a, 25b | Faces of half-shells of inner ring |
| 26 | Tongue |
| 27 | Recess |
| 28 | Hole |
| 29a, 29b | Projections |
| 30a, 30b | Depressions |
| 31 | Ribs |
| 32 | Locking depressions |
| 33 | Detents |
| 34 | Radial hole |
| 35a, 35b | Faces of half-shells of outer ring |
| 36 | Break |
| 37 | Projection |
| 38 | Depression |
| 39 | Circumferential projection |
| 40 | Circumferential groove |

What is claimed is:

1. A wearing ring, for protecting a cable guide hose on a robot, having an inner ring and an outer ring each two half-shells, wherein the halfshells of the inner ring are detachably locked together wherein both the inner ring and the outer ring are made from different colored plastics, so that after the outer ring has become worn, the color of the inner ring is detachable.

2. A wearing ring according to claim 1, wherein in each case one half-shell of one ring can be locked by means of a tongue located on at least one face facing the other half-shell of said ring in a recess located on the face of the other half-shell of said ring.

3. A wearing ring according to claim 2, wherein for releasing the tongue from the recess a hole is provided linking the recess with the outer circumference of the half-shell.

4. A wearing ring according to claim 2, wherein each half-shell of a ring is provided on its face facing the other half-shell of said ring with the tongue and on its other face (25b) facing the other half-shell of said ring with the recess equipped with a hole.

5. A wearing ring according to claim 4, wherein the hole traverses the half-shell substantially perpendicular to the recess.

6. A wearing ring according to claim 2, wherein the half-shells of the outer ring have a radial hole aligned with the hole linking the recess with the outer circumference of the half-shells of the inner ring.

7. A wearing ring according to claim 1, wherein the half-shells of the outer ring can be locked on the half-shells of the inner ring.

8. A wearing ring according to claim 7, wherein the half-shells of the outer ring can be secured by means of internally provided detents in complimentary locking depressions located externally of the half-shells of the inner ring.

9. A wearing ring according to claim 7, wherein the half-shells of the inner ring can be secured by means of externally located detents in complimentary locking depressions provided on the inside of the half-shells of outer ring.

10. A wearing ring according to claim 8, wherein the detents or locking depressions are in each case located in the vicinity of the ends of the half-shells.

11. A wearing ring according to claim 8, wherein in the vicinity of the ends of the half-shells two axially spaced detents or locking depressions are circumferentially successively provided.

12. A wearing ring according to claim 7, wherein on the faces of half-shells of inner ring on the side facing the half-shells of outer ring a break for releasing the half-shells of outer ring from the half-shells of inner ring is provided.

13. A wearing ring according to claim 7, wherein on the faces of half-shells of outer ring on the side facing half-shells of inner ring a break for releasing the half-shells of outer ring from the half-shells of inner ring is provided.

14. A wearing ring according to claim 7, wherein on the outside of the half-shells of inner ring and on the inside of half shells of outer ring complimentary centering devices are provided.

15. A wearing ring according to claim 14, wherein the centering devices are formed by at least one circumferential projection arranged circumferentially on the outside of the half-shells of inner ring and at least one circumferential groove located on the inside of the half-shells of outer ring.

16. A wearing ring according to claim 14, wherein the centering devices are formed by at least one circumferential projection positioned circumferentially on the inside of the half-shells of outer ring and at least one circumferential groove provided on the outside of half shells of inner ring.

17. A wearing ring according to claim 15, wherein two circumferentially positioned circumferential projections or two circumferential grooves complimentary thereto are provided.

18. A wearing ring according to claim 1, wherein on the facing faces of half-shells of at least one of the rings a centering means is provided.

19. A wearing ring according to claim 18, wherein the centering means is provided both on the inner ring and on the outer ring.

20. A wearing ring according to claim 18, wherein the centering means is in the form of at least one projection located on at least one face of half-shell of a ring and at least one complimentary depression located on the face, facing said face, of the other half-shell of said ring.

21. A wearing ring according to claim 18, wherein each half-shell of a ring is equipped on its face facing the other half-shell of said ring with at least one projection and on its face facing the other half-shell of said ring with at least one complimentary depression.

22. A wearing ring according to claim 1, wherein the half-shells of the inner ring have on the inside circumferential ribs for securing on a ribbed cable guide hose.

23. A wearing ring according to claim 22, wherein at least some of the ribs project from the face of one half-shell of the inner ring and the ribs of the other half-shell of inner ring aligned with the projecting ribs of one half-shell are correspondingly recessed.

24. A wearing ring according to claim 23, wherein each half-shell of inner ring is provided on its face facing the other half-shell of inner ring with at least two projecting ribs, which are correspondingly recessed on their other face.

25. A wearing ring according to claim 1, wherein both the inner ring and outer ring are made from plastic.

26. A wearing ring according to claim 1 in combination with:

a robot; and a guide hose, said guide hose being provided with the wearing ring.

* * * * *